United States Patent [19]

Schöenafinger et al.

[11] 4,052,326
[45] Oct. 4, 1977

[54] MANUFACTURE OF γ-IRON(III) OXIDE

[75] Inventors: Eduard Schöenafinger, Mannheim; Bernd Leutner, Maxdorf, both of Germany

[73] Assignee: BASF Aktiengesellschaft, Ludwigshafen, Germany

[21] Appl. No.: 718,690

[22] Filed: Aug. 30, 1976

Related U.S. Application Data

[63] Continuation-in-part of Ser. No. 514,095, Oct. 11, 1974, abandoned.

[30] Foreign Application Priority Data

Oct. 19, 1973 Germany .............................. 2352440

[51] Int. Cl.$^2$ .............................................. C01G 49/02
[52] U.S. Cl. .................................. 252/62.56; 423/634
[58] Field of Search ...................... 423/634; 252/62.56

[56] References Cited

U.S. PATENT DOCUMENTS

| 3,897,354 | 7/1975 | Woditsch et al. ................. 252/62.56 |
| 3,974,246 | 8/1976 | Chen et al. ......................... 252/62.56 |

FOREIGN PATENT DOCUMENTS

| 2,352,440 | 4/1975 | Germany |
| 114,800 | 11/1974 | Japan |

Primary Examiner—O. R. Vertiz
Assistant Examiner—Wayne A. Langel
Attorney, Agent, or Firm—Keil, Thompson & Shurtleff

[57] ABSTRACT

A process for the manufacture of acicular γ-iron(III) oxide of improved crystallinity and high coercive force by heating goethite or acicular alpha-iron(III) oxide particles at temperatures of from 500° to 800° C, reduction of the resulting product at temperatures of from 280° to 600° C and subsequent oxidation of the magnetite to γ-iron(III) oxide of improved crystallinity and high coercive force.

4 Claims, No Drawings

MANUFACTURE OF γ-IRON(III) OXIDE

RELATED APPLICATION

This application is a continuation-in-part of our application Ser. No. 514,095, filed Oct. 11, 1974, now abandoned.

This application discloses and claims subject matter described in German patent application No. P 23 52 440.5, filed Oct. 19, 1973, which is incorporated herein by reference.

The invention relates to a process for the manufacture of acicular particulate γ-iron(III) oxide of improved crystallinity and high coercive force.

Magnetic recording media usually comprise a base and, applied thereto, a magnetic coating in which the magnetizable material is incorporated in a binder system suited to the particular end use. Although some special products and chromium dioxide are used as the magnetic component, γ-iron(III) oxide is mainly employed for this purpose. It has been known for a long time how to manufacture this acicular γ-iron(III) oxide which has a length/width ratio of from 15:1 to 3:1. The oxide is obtained by dehydrating acicular hydrated iron oxide to γ-iron(III) oxide, reducing the latter to magnetite and re-oxidizing the magnetite to γ-iron(III) oxide. Although the acicular shape is substantially retained during the conversions, the reaction conditions employed nevertheless have a decisive influence on the size, shape and crystallinity of the γ-iron(III) oxide obtained. However, these parameters have a decisive effect on the magnetic properties of the magnetic pigment.

It is known (cf. German Published Application No. 1,592,214) that in the conversion of hydrated α-iron oxide or of α-iron(III) oxide to magnetite high reduction temperatures have a favorable effect on the formation of highly crystalline particles and on the coercive force of the γ-iron(III) oxide obtained from the magnetite by oxidation. However, high reduction temperatures of, for example, about 400° C and above can also impair the quality of the magnetic pigment because they cause sintering of the magnetic particles or cause the individual magnetic particles to lose their acicular shape; in both cases the shape required for shape anisotropy is lacking. In addition, the agglomerates cannot be finely dispersed in the binder without being mechanically destroyed. This impairs the magnetic and electroacoustic properties of the magnetic recording media produced therewith.

Heating of goethite (U.S. Pat. No. 2,694,656) also failed to bring about the desired improvements.

These disadvantages can be substantially overcome by applying inorganic coatings, for example coatings of borates, phosphates, silicates, aluminum salts, titanium salts and zirconium salts of (cf. German Published Applications Nos. 1,592,214 and 1,803,783 and Belgian Pat. 668,986) to the surface of the hydrated α-iron oxide needles. Howver, such coatings are undesirable in the end product, namely γ-iron(III) oxide. They modify the surface properties of the pigment and lower the magnetic flux of the product even at the proposed proportions by weight; moreover, the metal ions of the coatings may become incorporated in the crystals at the high temperatures employed in the subsequent conversion reactions.

A further disadvantage which has to be tolerated at the high reduction temperatures which are desirable is that the reduction can go beyond the magnetic stage and give metallic iron which, during oxidation of the magnetite, is converted into non-magnetic α-iron(III) oxide.

It is an object of the present invention to provide a process for the manufacture of acicular particulate γ-iron(III) oxide, which gives a homogeneous, highly crystalline product of high coercive force and in which magnetization is not lowered by additives.

We have now found that acicular γ-iron(III) oxide of improved crystallinity and high coercive force is obtained by heating goethite or acicular α-iron(III) oxide at temperatures of from 500° to 800° C, reducing the resulting product to magnetite at temperatures of from 280° to 600° C and subsequently oxidizing the magnetite to γ-iron(III) oxide, the magnetite obtained by reducing being heated in an inert gas atmosphere at temperatures of from 400° to 600° C.

The process according to the invention promotes the formation of highly crystalline particles and consequently gives pigments of high coercive force without requiring the use of the high reduction temperatures which are recognized to the disadvantageous. Although high reduction temperatures used for the conversion of α-iron(III) oxide oxide to magnetite give highly crystalline magnetitite particles, the over-reduction to metallic iron which occurs under such conditions is undesirable since metallic iron in this finely divided form sinters very easily and gives non-magnetic α-iron(III) oxide during the subsequent oxidation.

If, on the other hand, the conversion to magnetite is carried out at low temperatures, no metallic iron is produced.

If some magnetite is now treated in accordance with the invention in an inert gas atmosphere at temperatures of from 400° to 600° C, a magnetic pigment of high coercive force is formed in the subsequent oxidation to γ-iron(III) oxide. Nitrogen is a suitable inert gas, but others, such as the noble gases, can also be employed.

Inasmuch as it was known (cf. German Published Application No. 1,592,214) that in the production of magnetite by reduction of hydrated γ-iron oxide or of γ-iron (III) oxide high temperatures have a favorable effect on the crystallinity and consequently on the coercive force of the γ-iron(III) oxide obtained from the magnetite by reduction, but that at temperatures of more than 400° C sintering of the magnetite particles can occur if special precautions are not taken, and the reduction can go beyond the magnetite stage and give metallic iron, the reduction temperature chosen in the treatment of the magnetite should advantageously be as low as possible, e.g. from 300° to 370° C, and, after the magnetite has formed, heat should be added to the magnetite in accordance with the improved process of the invention to maintain an increased temperature of from 400° to 600° C.

The oxidation of such magnetite to γ-iron(III) oxide can then be carried out in a conventional manner, preferably by passing air over the product, or treating it with oxygen, at temperatures of from about 200° to 400° C.

The process according to the invention is just as advantageous for the production of modified γ-iron(III) oxides as for the manufacture of pure γ-iron(III) oxide. A number of elements are known as modifiers, but in the main cobalt is used to modify the γ-iron(III) oxide, 0.25 to 25% by weight, based on iron(III) oxide, of cobalt being advantageously added. Modification can be effected either by co-precipitation of iron hydroxide and cobalt hydroxide followed by further conversion of the precipitate by conventional methods or by precipitation of cobalt hydroxide onto hydrated α-iron oxide.

The γ-iron(III) oxides manufactured according to the invention exhibit surprisingly advantageous properties when used as magnetic pigments for the manufacture of magnetic recording media. To produce magnetic coatings, the γ-iron(III) oxide is dispersed in polymeric binders, suitable binders for this purpose being known compounds such as homopolymers and copolymers of polyvinyl chloride derivatives, polyurethanes, polyesters and the like. The binders are used as solutions in suitable organic solvents which may contain further additives. The magnetic coatings are applied to rigid or flexible bases such as discs, films and cards.

The γ-iron(III) oxides manufactured in accordance with the invention differ distinctly from known γ-iron(III) oxides in that they have a more uniform acicular shape and exhibit improved crystallinity and a higher coercive force.

The invention is further illustrated by the following Examples. The starting material employed for the manufacture of the γ-iron(III) oxide according to the invention is an acicular goethite obtained according to German Printed Application No. 1,204,644.

The magnetic measurements were made with a conventional vibrating sample magnetometer. Samples of the pigments were placed in cylindrical tubes and tamped until the tap density was 1.0 g/cm$^3$, and measured in a uniform magnetic field of 2,000 oersteds. The coercive force ($H_c$) is given in oersteds and the specific remanence ($4\pi\sigma_R$) and specific saturation magnetization ($4\pi\sigma_S$) are given in gauss × cm$^3$ × g$^{-1}$.

EXAMPLE 1

1,000 g of goethite are heated for two hours at 600° C in a muffle furnace in air. After cooling, the material is ground and sieved. The fraction of from 0.2 to 0.4 mm is used as the starting material for conversion to magnetite and γ-iron(III) oxide.

50 g of the heated goethite are reduced to magnetite in a fluidized-bed furnace at 300° in the course of 4.5 hours using 600 l of hydrogen per hour. The magnetite is then heated at 450° C under nitrogen for 20 minutes. After cooling to 210° C, the magnetite is converted to γ-iron(III) oxide by treating it for two hours with a mixture of 200 l of air and 500 l of nitrogen per hour.

COMPARATIVE EXPERIMENT 1

The procedure of Example 1 was followed except that the magnetite was not heat-treated.
The magnetic values are:

|  | $H_c$ | $4\pi\sigma_R$ | $4\pi\sigma_S$ |
|---|---|---|---|
| Example 1 | 381 | 410 | 840 |
| Comparative experiment 1 | 352 | 376 | 853 |

500 g of goethite are suspended in 10 l of water and finely dispersed by stirring with a high-speed stirrer (for example at 20,000 rpm). At the same time 97 g of a cobalt nitrate solution containing 116 g of cobalt per 1,000 g of solution are added and cobalt hydroxide is then precipitated by the dropwise addition of dilute ammonia solution. Since a thick slurry, which can only be stirred with great difficulty, is formed on addition of the alkali, small amounts of sodium pyrophosphate are added to maintain it in a mobile state. As soon as the pH valve exceeds 8, the suspension is filtered and the filter cake is thoroughly washed and dried.

The ground product is heated for one hour in a muffle furnace at 600° C. It is then comminuted and 50 g of the fraction of from 0.2 to 0.4 mm are introduced into a tubular fluidized-bed reactor and reduced to magnetite at 370° C using a gas mixture of 300 l of hydrogen and 300 l of nitrogen per hour. The resulting magnetic is then heated to 450° C whilst passing 600 l of nitrogen through the tube, and is kept at this temperature for 30 minutes. The subsequent oxidation to γ-iron(III) oxide is carried out at 230° C with a mixture of 200 l of air and 500 l of nitrogen per hour.

The resulting γ-iron(III) oxide contains 2.4% by weight of Co (based on Fe$_2$O$_3$) and its magnetic values are:

$$H_c = 560 \quad 4\pi\sigma_S = 419 \quad 4\pi\sigma_R = 723$$

EXAMPLE 3

1,670 g of 50% strength potassium hydroxide solution at a temperature of 30° C are introduced into a 25-liter stirred vessel. 4,675 g of an iron(II) chloride solution which contains 134 g of iron per kilogram of solution are added dropwise whilst stirring continuously. After heating the mixture to 45° C, 300 l of air per hour is passed through the mixture via a tubular ring provided with fine holes which is arranged at the bottom of the vessel. At the same time, 3 liters of an aqueous cobalt nitrate solution containing 12.5 g of cobalt are added dropwise in the course of 5 hours. The oxidation of the iron hydroxide to goethite takes 16 hours. The cobalt-modified goethite is filtered off, washed and dried. The cobalt content is 1.42%, based on iron oxide.

500 g of this product are dehydrated for one hour at 500° C. The α-iron(III) oxide obtained is reduced to magnetite with hydrogen at 320° C. This magnetite is heated under nitrogen at 470° C for 10 minutes and then converted to γ-iron(III) oxide with air at 220° C.

COMPARATIVE EXPERIMENT 3

500 g of the modified goethite obtained according to Example 3 are converted to γ-iron(III) oxide by the method described in Example 3, except that the magnetite is not heat-treated.

|  | $H_c$ | $4\pi\sigma_S$ | $4\pi\sigma_R$ |
|---|---|---|---|
| Example 3 | 439 | 430 | 773 |
| Comparative experiment 3 | 363 | 432 | 779 |

We claim:
1. In a process for the manufacture of acicular γ-iron(III) oxide of improved crystallinity and high coercive force by heating goethite or acicular γ-iron(III) oxide at a temperature of from 500° to 800° C, reducing the resulting product to magnetite at a temperature of from 280° to 600° C and subsequently oxidizing the magnetite to γ-iron(III) oxide, the improvement which comprises adding heat to the magnetite in an inert gas atmosphere to maintain a temperature of from 400° to 600° C after the reduction step has been completed.
2. A process as claimed in claim 1 wherein the goethite or the acicular γ-iron(III) oxide is modified with 0.5 to 25 percent by weight of cobalt, based on iron(III) oxide.
3. A process as claimed in claim 1 wherein the inert gas atmosphere is a nitrogen atmosphere.
4. A process as claimed in claim 1 wherein the reduction temperature is not less than 300° and not more than 370° C.

* * * * *